United States Patent
Hofer

(10) Patent No.: US 7,369,009 B2
(45) Date of Patent: May 6, 2008

(54) OSCILLATOR DEVICE FOR FREQUENCY MODULATION

(75) Inventor: Günter Hofer, St. Oswald (AT)

(73) Assignee: Austriamicrosystems AG (AT)

( * ) Notice: Subject to any disclaimer, the term of this patent is extended or adjusted under 35 U.S.C. 154(b) by 74 days.

(21) Appl. No.: 10/542,719

(22) PCT Filed: Dec. 18, 2003

(86) PCT No.: PCT/EP03/14461

§ 371 (c)(1),
(2), (4) Date: Jan. 17, 2006

(87) PCT Pub. No.: WO2004/066578

PCT Pub. Date: Aug. 5, 2004

(65) Prior Publication Data

US 2006/0103475 A1   May 18, 2006

(30) Foreign Application Priority Data

Jan. 22, 2003   (DE) ............................. 103 02 391

(51) Int. Cl.
    *H03L 5/00* (2006.01)
(52) U.S. Cl. ................. 331/183; 331/177 R; 331/186; 331/117 FE; 331/116 R; 332/100
(58) Field of Classification Search ............... 331/106, 331/117 R, 116 R, 116 FE, 158, 167, 177 R, 331/182, 183, 185; 327/156, 157; 332/100; 375/303, 334
See application file for complete search history.

(56) References Cited

U.S. PATENT DOCUMENTS

| 2,874,216 A | 2/1959 | Scuitto |
| 3,641,460 A | 2/1972 | Holsinger |
| 4,071,832 A * | 1/1978 | Cloke ...................... 331/117 R |
| 4,581,593 A * | 4/1986 | Okanobu ................. 331/116 R |
| 5,150,377 A | 9/1992 | Vannucci |
| 5,323,125 A * | 6/1994 | Hiben et al. ................. 332/100 |
| 5,687,201 A | 11/1997 | McClellan et al. |
| 6,198,360 B1 * | 3/2001 | Henrion ................... 331/177 R |
| 2002/0041216 A1 * | 4/2002 | Welland et al. ......... 331/117 R |

FOREIGN PATENT DOCUMENTS

| DE | 38 36 822 | 6/1993 |
| DE | 691 23 942 | 4/1997 |
| EP | 0 484 065 | 1/1997 |
| JP | 02-048807 | 2/1990 |
| JP | 03-032206 | 2/1991 |

OTHER PUBLICATIONS

Copy of proceeding dated Nov. 21, 2006 in the corresponding German Patent Application No. 10302391.7-42.

* cited by examiner

*Primary Examiner*—Robert J. Pascal
*Assistant Examiner*—Ryan J Johnson
(74) *Attorney, Agent, or Firm*—Fish & Richardson P.C.

(57) ABSTRACT

The present invention pertains to an oscillator arrangement for carrying out a frequency modulation process, wherein an oscillator (1) with automatic amplitude control (5, 6, 7) is provided. The shift keying is not realized with reconnectable capacitances in the oscillator (1) that determine its oscillator frequency, but rather by suitably influencing (6) the feed current of the oscillator in dependence on the modulation signal (FSK), namely with the aid of the amplitude control (5, 6, 7). Undesirable charge injections do not occur in the proposed oscillator arrangement because reconnectable capacitances are no longer required for achieving the desired frequency deviation.

17 Claims, 2 Drawing Sheets

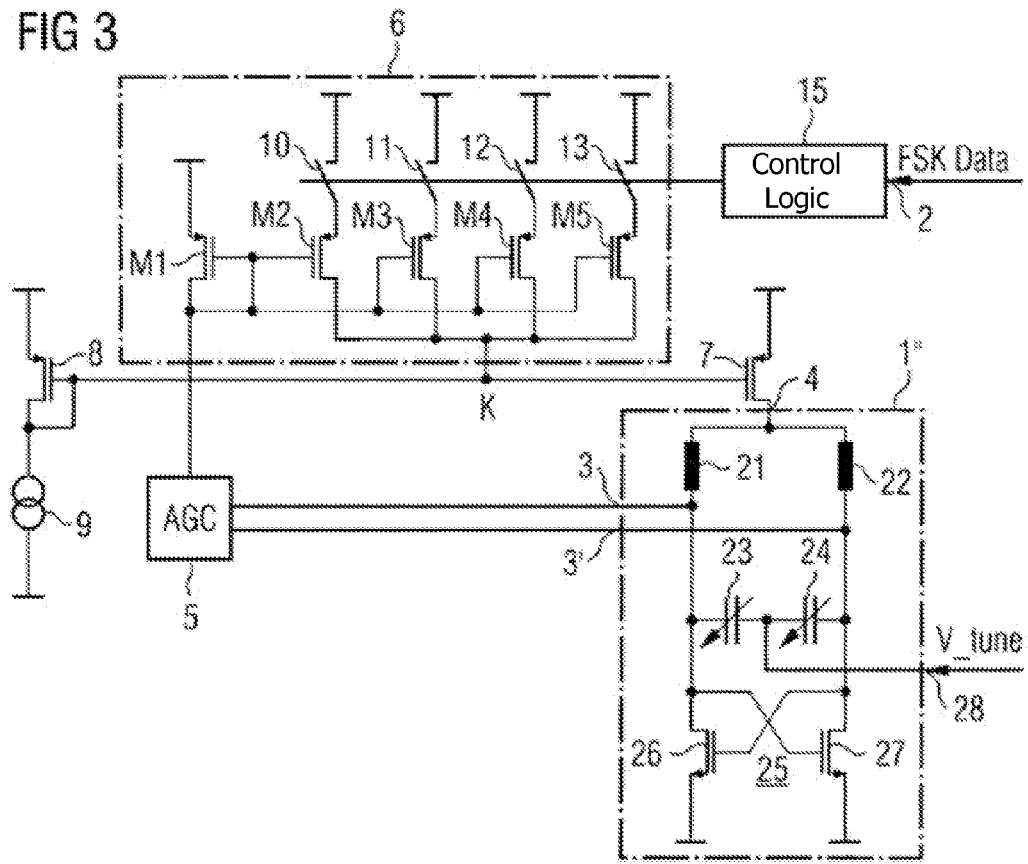
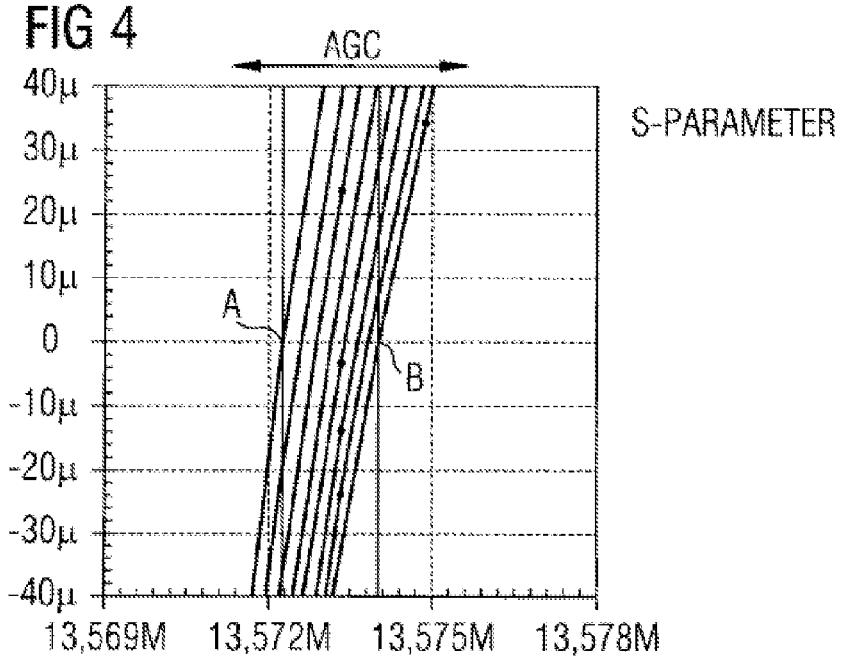

OSCILLATOR DEVICE FOR FREQUENCY MODULATION

TECHNICAL FIELD

This patent application relates to an oscillator arrangement that is designed for carrying out frequency modulation processes.

BACKGROUND

Among digital modulation methods, frequency shift keying or FSK, amplitude shift keying and phase shift keying, as well as combinations of these methods, are broadly utilized for the digital modulation of a carrier signal.

One option for subjecting a carrier signal to frequency shift keying consists of directly modulating the carrier signal when it is generated in the oscillator.

In this case, the frequency shift keying of the oscillator is usually achieved by connecting or disconnecting small, frequency-determining capacitors to a resonant circuit formed in the oscillator. The digital modulation signal is modulated on the carrier with the desired frequency deviation in this fashion.

The oscillator may be realized, for example, in the form of a crystal oscillator or an LC-oscillator. In a crystal oscillator, the oscillation frequency is primarily determined by the oscillation frequency of the crystal. In an LC-oscillator, however, at least one inductor and at least one capacitor influence the oscillation frequency.

For example, in order to achieve a frequency deviation of 60 KHz, it is necessary to connect and disconnect comparatively large capacitors in the so-called oscillator tank. However, the connecting and disconnecting of capacitors is always associated with charge injection problems. Undesirable interferences not only occur in the power supply of the oscillator, but also in the substrate terminal of an integrated oscillator. These charges negatively affect the oscillator, for example, a voltage-controlled oscillator, and also influence its output spectrum in an interfering fashion. In addition, the integration of a reconnectable capacitor requires a relatively large chip surface.

SUMMARY

Disclosed herein is an oscillator arrangement that is suitable for use in modulation processes that are carried out in accordance with frequency shift keying and in which problems due to charge injections are prevented or at least significantly reduced.

Described herein is an oscillator arrangement for frequency modulation that comprises
  a control input for supplying a modulation signal,
  an oscillator output for tapping a frequency-modulated signal,
  an oscillator with an input for supplying a feed current and with an oscillator output,
  a control circuit for amplitude control with an input that is connected to the oscillator output and with an output that is connected to the input for supplying a feed current for the oscillator, and
  a means for influencing the feed current in dependence on the modulation signal, wherein said means is arranged in the control circuit and coupled to the input of the oscillator for supplying a feed current.

According to the proposed principle, the automatic amplitude control that is normally provided in a controlled frequency modulation oscillator anyhow is also utilized for controlling the operating current of the oscillator and thereby influencing or modulating the oscillator frequency in the desired fashion. This means that the oscillator is modulated due to the fact that the loop amplification of the amplification control loop is controlled by influencing the feed current of the oscillator.

The amplitude control circuit may be used for varying the so-called tail current of the oscillator in accordance with the current deduction technique, namely under the control of the modulation signal, such that the frequency is also varied in small increments.

The proposed principle can be advantageously utilized in connection with LC-oscillators as well as crystal oscillators.

According to the proposed principle, it is possible to completely eliminate reconnectable capacitors for the frequency shift keying process. Consequently, the charge injection problem is also eliminated and the power supply is not subjected to any undesirable retroactions. In addition, the circuit can be realized on a particularly small chip surface. The triggering of the means for influencing the feed current in dependence on the modulation signal can be realized with a simply designed control block.

The means for influencing the feed current may comprise several current switches that are connected in parallel with respect to their switched sections. Depending on the modulation signal, the parallel-connected current switches may be controlled in such a way that just the current required for detuning the frequency in the desired fashion is deducted.

The parallel-connected current switches may be arranged in a current mirror with their output side. In this case, one respective transistor of the current mirror and one switch assigned thereto may form a series circuit. The series circuits are connected to one another in parallel in this case. The switches can be connected and disconnected independently of one another. The frequency of the oscillator can be easily modulated by a current control, in which the loop amplification of the automatic control loop is controlled by triggering the current switches accordingly.

The current mirror with the parallel-connected current switches may act upon another current mirror that couples a feed current source for supplying the oscillator with the oscillator. The circuit node at which the current mirror with the current switches manipulates the feed current for the oscillator may be arranged on the common gate terminal or base terminal of the current mirror transistors in the additional current mirror in this case. This causes part of the current made available by the constant power source to be deducted by the current switches in dependence on the modulation signal such that the oscillator frequency is modulated.

A control block may be provided for triggering the current switches, wherein said control block has an input for supplying the modulation signal and one or more outputs that are connected to the respective control terminals of the assigned current switches.

The modulation signal may include a signal that is digitally coded in accordance with frequency shift keying or FSK.

The oscillator may be realized in a tunable fashion and contains an additional control input for supplying a tuning signal and a capacitor that determines the oscillation frequency and is controlled in dependence on the tuning signal. A tunable capacitor of this type may be realized in the form of a varactor diode. A voltage-controlled oscillator or VCO is realized in this fashion.

Other details and advantageous are described below.

DESCRIPTION OF THE DRAWINGS

FIG. 3, another embodiment of an oscillator arrangement according to FIG. 1 with an LC-oscillator, and FIG. 4, the resonant frequency in dependence on the loop amplification of the amplitude control in the form of an S-parameter diagram of a crystal oscillator according to FIG. 2.

DETAILED DESCRIPTION

Figure 1:
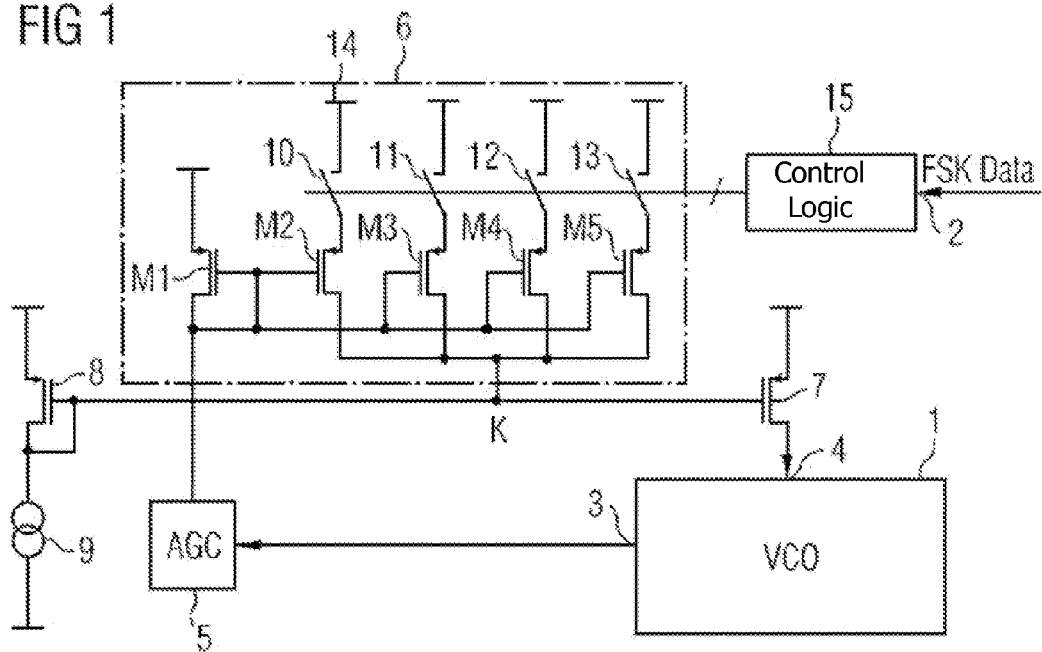
FIG. 1, a block diagram of an exemplary oscillator arrangement for carrying out frequency modulation processes in accordance with the proposed principle.

FIG. 1 shows an oscillator arrangement that is designed for carrying out frequency modulation processes. This oscillator arrangement comprises an oscillator 1, as well as a control input 2 for supplying a modulation signal. The oscillator 1 has an output 3, at which a frequency-modulated signal can be tapped. The oscillator 1 also has an input 4 for supplying a feed current. The feed current is used, among other things, for the attenuation equalization of the resonant circuit formed in the oscillator 1. The feed current is also referred to as a base current or tail current. The oscillator is arranged in an amplitude control circuit in order to ensure its stability. The control circuit for the amplitude control comprises an AGC block 5, a first current mirror 6 and a second current mirror 7, 8. The output of the first current mirror 6 controls a power source transistor 7 that is connected to the feed current input 4 of the oscillator 1 and its power source output. A diode transistor 8 forms the second current mirror together with the power source transistor 7. The common gate terminal of the transistors 7, 8 that is connected to the output of the first current mirror 6 is referred to as the circuit node K. The input of the second current mirror 7, 8 is connected to a power source 9 for supplying the oscillator 1 with a reference current. The current mirror 6 comprises a diode transistor M1 and a total of four parallel-connected current mirror transistors M2, M3, M4, M5 on its output side that can be connected and disconnected independently of one another. This is achieved with one respective switch 10, 11, 12, 13 for connecting a reference potential terminal 14 with a load terminal of the controlled section of the assigned transistor M2, M3, M4, M5, in this case, with their source terminal. The gate terminals of the field effect transistors M1 through M5 are directly connected to one another in the current mirror 6. The transistor M1 functions as a diode due to the fact that its gate terminal is directly connected to its drain terminal. The source terminal of the n-channel field effect transistor M1 is connected to the reference potential terminal 14. The drain terminals of the transistors M2 through M5 are directly connected to one another in the circuit node K and form the output of the current mirror 6. The circuit node K is directly connected to the gate terminals of the current mirror transistors 7, 8.

The switches 10, 11, 12, 13 are realized in the form of current switches and controlled by a logic control that is arranged in a corresponding control block 15, the input of which forms the control input 2 for supplying a modulation signal for the oscillator arrangement and the output of which is connected to the control terminals of the switches 10, 11, 12, 13.

An optionally provided tuning input of the voltage-controlled oscillator 1 is not illustrated in FIG. 1.

The peculiarity of the circuit shown in FIG. 1 can be seen in the fact that reconnectable capacitances in the oscillator core are not directly controlled based on the modulation data in order to influence the oscillation frequency of the oscillator, but that the modulation data manipulate the amplitude control of the oscillator 1. In this case, an indirect shift keying of the oscillator frequency is realized by controlling the oscillator feed current. The amplitude control circuit 5, 6, 7 comprises switchable current mirrors that make it possible to adjust the frequency of the oscillator. The modulation signal consequently controls the loop amplification of the amplitude control circuit 5, 6, 7. The frequency shift keying of the oscillator 1 is realized with the current switches in this case, namely in accordance with a current deduction technique. This means that reconnectable capacitors are no longer required for the frequency shift keying in the oscillator. This leads to significant advantages with respect to charge injections, retroactions on the power supply, a simple triggering process and the required chip surface.

Figure 2:
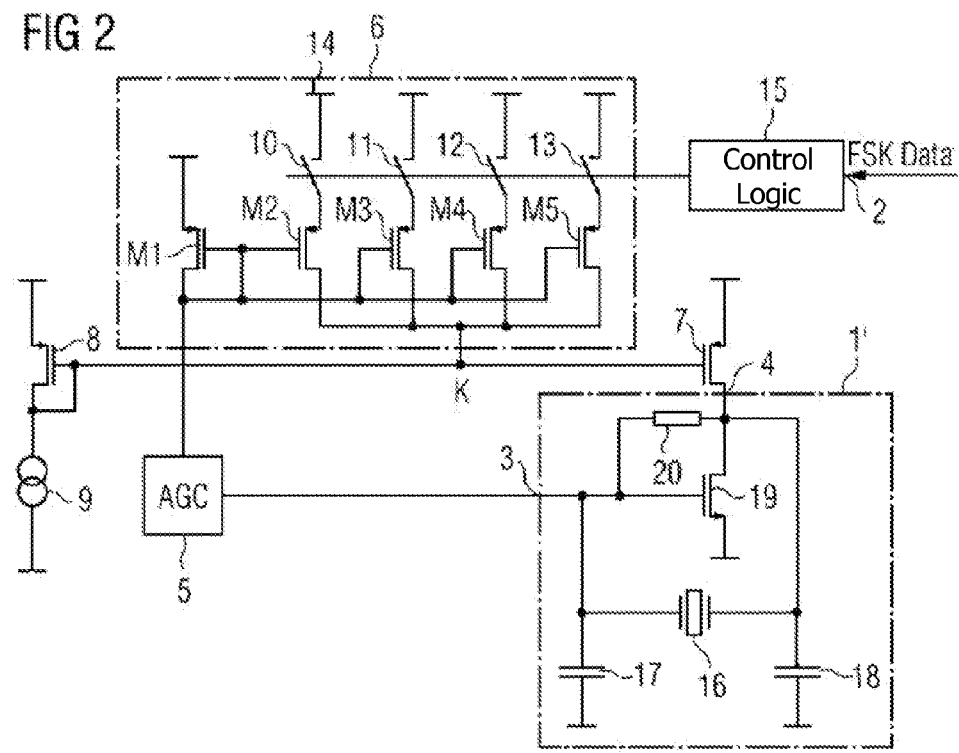
FIG. 2, an additional development of the oscillator arrangement according to FIG. 1 that is designed for a crystal oscillator.

FIG. 2 shows another embodiment of an oscillator arrangement with an oscillator that is realized in the form of a crystal oscillator 1'. The amplitude control including the switchable power sources and the amplitude control circuit, as well as the triggering thereof with the modulation signal, correspond to FIG. 1. This is the reason why these aspects are not discussed anew. The oscillator 1' shown in FIG. 2 is realized in the form of a crystal oscillator and comprises an oscillator crystal 16. Both terminals of the oscillator crystal 16 are connected to the reference potential via one respective capacitor 17, 18. An amplifier comprising a p-channel field effect transistor 19 is provided in order to realize the attenuation equalization of the resonant system. The gate terminal of the transistor 19, on which the output 3 of the oscillator is simultaneously formed, is connected to one of the two terminals of the crystal 16. The source terminal of the transistor 19 is connected to the reference potential. The drain terminal of the transistor 19 that forms the input for supplying a feed current 4 for the oscillator 1' is connected to the gate terminal of the transistor 19 via a resistor 20, as well as to the other terminal of the crystal 16. In the circuit shown in FIG. 2, it is possible to realize a frequency deviation between 10 kHz and 100 kHz by triggering the current switches 10, 11, 12, 13 accordingly in dependence on the modulation signal. The data rate can lie between 0 and 20 kbit/sec. In order to prevent self-mixing, the time constant of the amplitude control of the amplitude control circuit 5, 6, 7 should be adjusted significantly shorter than the time constant of the oscillator. In the crystal oscillator shown, the frequency is varied as a function of the current and consequently as a function of the amplitude being adjusted. Due to the utilization of an amplitude control, the oscillator tail current and therefore the frequency can be varied by a digitally controlled current deduction technique. Only slight charge shifts occur at frequency deviations up to plus/minus 100 kHz. An application-dependent weighting of the transistors M1 through M5 makes it possible to adjust practically any desired frequency deviation within the above-described range.

According to the proposed principle, charge injections are eliminated, undesirable retroactions of interference signals on the power supply are prevented, the circuits can be integrated on a comparatively small chip surface, and the current switches can be triggered by a logic control 15 of particularly simple design.

FIG. 3 shows an embodiment of the proposed principle with an LC-oscillator 1". Aside from the shape of the oscillator 1", the design of the oscillator arrangement according to FIG. 3 largely corresponds to that shown in FIG. 1 with respect to the components used, their respective connections and the advantageous function of the oscillator arrangement. Consequently, these aspects are not discussed anew at this point. The oscillator 1" is realized in the form of a tunable LC-resonant circuit and, as such, comprises two fixed inductances 21, 22, two tunable capacitances 23, 24 and an attenuation equalization amplifier 25 that comprises two cross-coupled p-channel transistors 26, 27. The inductances 21, 22 connect the feed current input 4 of the oscillator 1" to the pair of output terminals 3, 3' of the oscillator 1". The tuning input 28 of the oscillator for supplying a tuning signal is connected to the output terminals 3, 3' via one respective varactor 23, 24. The source terminals of the transistors 26, 27 are grounded. One respective gate terminal of the transistors 26, 27 is connected to one respective drain terminal of the other transistor such that a cross coupling is produced. The two drain terminals of the attenuation equalization amplifier 25 form the output 3, 3' of the LC-oscillator. The attenuation equalization amplifier 25 delivers a negative resistance or a negative impedance.

In order to prevent self-mixing, the time constant of the amplitude control 5, 6, 7 needs to be much faster than the time constant of the oscillator. The proposed circuit makes it possible to achieve a frequency deviation between 10 kHz and a few MHz. The attainable data rate may be as high as a few Mbit per second.

The circuit according to FIG. 3 provides the same advantages as the circuit according to FIG. 2, namely the elimination of undesirable charge injections, the prevention of undesirable interferences in the power supply of the circuit, the ability to implement the circuit on a small chip surface and a simply designed logic control 15.

FIG. 4 shows a diagram of the resonant frequency of the crystal oscillator according to FIG. 2 as a function of the amplification of the amplitude control loop, namely in the form of an S-parameter diagram. In this case, the loop amplification serves as the system parameter. One can ascertain that a range of approximately 1800 Hz can be covered by varying the amplification of the amplitude control circuit. This diagram verifies the functionality of the proposed principle, namely the frequency shift keying by switchable amplitude control of an oscillator.

If the described tunable oscillator is integrated into a phase-locked loop (PLL), the time constant of the controller may be chosen such that it does not react to short-term frequency changes caused by the frequency modulation.

The invention claimed is:

1. Control circuitry for use with an oscillator, comprising:
a control input configured to provide a modulation signal;
an oscillator comprising an oscillator input configured to receive a feed current and an oscillator output configured to provide a frequency-modulated signal; and
an amplitude control circuit comprising an amplitude control input that is connected to the oscillator output and an amplitude control output that is connected to the oscillator input to provide the feed current to the oscillator;
wherein the amplitude control circuit comprises internal circuitry configured to affect the feed current in response to the modulation signal.

2. The control circuitry of claim 1, wherein the internal circuitry comprises current switches that are connected in parallel.

3. The control circuitry of claim 2, wherein the current switches comprise current mirror circuits.

4. The control circuitry of claim 3, wherein the amplitude control circuit further comprises a gain control circuit and a second current mirror circuit;
wherein the current mirror circuits connect to an output of the gain control circuit, the gain control circuit being configured to receive the oscillator output; and
wherein the second current mirror circuit provides the feed current to the oscillator input.

5. The control circuitry of claim 2, further comprising a control circuit, the control circuit comprising the control input and an output that is connected to control inputs of the current switches;
wherein the control circuit is configured to trigger the current switches in response to the modulation signal.

6. The control circuitry of claim 1, wherein the modulation signal is digitally coded using frequency shift keying.

7. The control circuitry of claim 1, wherein the oscillator comprises a tunable oscillator that comprises at least one capacitive circuit that can be adjusted in response to a tuning voltage in order to affect an oscillation frequency of the oscillator.

8. The control circuitry of claim 1, wherein the oscillator comprises an inductive-capacitor oscillator that comprises a resonant circuit, at least one capacitive circuit that is usable to affect a frequency of the resonant circuit, and at least one inductive circuit that is usable to affect the frequency of the resonant circuit.

9. The control circuitry of claim 1, wherein the oscillator comprises a crystal oscillator comprising an oscillator crystal that is usable to affect an oscillation frequency of the oscillator.

10. The control circuitry of claim 3, wherein the modulation signal is digitally coded using frequency shift keying.

11. The control circuitry of claim 3, wherein the oscillator comprises a tunable oscillator that comprises at least one capacitive circuit that can be adjusted in response to a tuning voltage in order to affect an oscillation frequency of the oscillator.

12. The control circuitry of claim 3, wherein the oscillator comprises an inductive-capacitor oscillator that comprises a resonant circuit, at least one capacitive circuit that is usable to affect a frequency of the resonant circuit, and at least one inductive circuit that is usable to affect the frequency of the resonant circuit.

13. The control circuitry of claim 3, wherein the oscillator comprises a crystal oscillator comprising an oscillator crystal that is usable to affect an oscillation frequency of the oscillator.

14. The control circuitry of claim 4, wherein the modulation signal is digitally coded using frequency shift keying.

15. The control circuitry of claim 4, wherein the oscillator comprises a tunable oscillator that comprises at least one capacitive circuit that can be adjusted in response to a tuning voltage in order to affect an oscillation frequency of the oscillator.

16. The control circuitry of claim 4, wherein the oscillator comprises an inductive-capacitor oscillator that comprises a resonant circuit, at least one capacitive circuit that is usable to affect a frequency of the resonant circuit, and at least one inductive circuit that is usable to affect the frequency of the resonant circuit.

17. The control circuitry of claim 4, wherein the oscillator comprises a crystal oscillator comprising an oscillator crystal that is usable to affect an oscillation frequency of the oscillator.

* * * * *

UNITED STATES PATENT AND TRADEMARK OFFICE
CERTIFICATE OF CORRECTION

PATENT NO. : 7,369,009 B2
APPLICATION NO. : 10/542719
DATED : May 6, 2008
INVENTOR(S) : Günter Hofer It is certified that error appears in the above-identified patent and that said Letters Patent is hereby corrected as shown below:

Title Page, Item (57)
Please DELETE the Abstract and replace with the Abstract below (as amended in the Preliminary Amendment filed on July 20, 2005):

-- Control circuitry for use with an oscillator includes a control input configured to receive a modulation signal, an oscillator that includes an oscillator input configured to receive a feed current and an oscillator output configured to provide a frequency-modulated signal, and an amplitude control circuit that includes an amplitude control input that is connected to the oscillator output and an amplitude control output that is connected to the oscillator input to provide the feed current to the oscillator. The amplitude control circuit includes circuitry configured to affect the feed current in response to the modulation signal. --

Signed and Sealed this

Twenty-sixth Day of January, 2010

David J. Kappos
*Director of the United States Patent and Trademark Office*